United States Patent [19]

Kubo

[11] Patent Number: 4,735,188

[45] Date of Patent: Apr. 5, 1988

[54] WIRE SAW DRIVE APPARATUS

[75] Inventor: Setsuo Kubo, Kyoto, Japan

[73] Assignee: Kabushiki Kaisha Dymosha, Kyoto, Japan

[21] Appl. No.: 37,243

[22] Filed: Apr. 10, 1987

[30] Foreign Application Priority Data

Apr. 12, 1986 [JP] Japan .............................. 61-55279[U]

[51] Int. Cl.⁴ ............................................ B28D 1/08
[52] U.S. Cl. ........................................ 125/21; 125/12;
83/651.1; 83/816; 299/35
[58] Field of Search .................... 125/12, 21; 83/651.1,
83/661, 814, 816; 299/35, 63; 51/135 R, 135 BT

[56] References Cited

U.S. PATENT DOCUMENTS

| 558,483 | 4/1896 | Clark | 299/35 |
|---|---|---|---|
| 753,092 | 2/1904 | Neukirch | 299/35 |
| 2,150,381 | 3/1939 | Lansing | 125/21 |
| 2,674,238 | 4/1954 | Dessureau et al. | 125/21 |
| 3,599,623 | 8/1971 | Phy | 125/21 |
| 4,633,848 | 1/1987 | Bresciani | 125/21 |

FOREIGN PATENT DOCUMENTS 0569291 4/1924 France ................. 299/35

Primary Examiner—Frederick R. Schmidt
Assistant Examiner—Shirish Desai
Attorney, Agent, or Firm—Franklin D. Wolffe; Morris Fidelman

[57] ABSTRACT

In a wire saw drive apparatus having a carriage, a wire drive pulley mounted on the carriage, pulley drive means for rotating the wire drive pulley to drive an endless cutting wire, a pair of adjust pulleys for guiding a tensile side and a loose side of the cutting wire, and carriage drive means for moving the carriage and maintaining the cutting wire under a desired tension, the improvement comprises elastic means mounted between an adjust pulley supporting body for guiding at least the tensile side of the cutting wire and the carriage, for receiving a force applied from the cutting wire to the adjust pulley, and a guide pulley mounted on the carriage near the adjust pulley for guiding the tensile side of the cutting wire, for guiding the cutting wire into S shape fashion in cooperation with the adjust pulley.

The elastic means instantaneously absorbs an instantaneous increase in cutting wire tension through the adjust pulley, and suppresses cutting wire damage or breakage and cutting wire slip relative to the wire drive pulley. The guide pulley serves to allow the above elastic means to function stably and effectively.

5 Claims, 3 Drawing Sheets

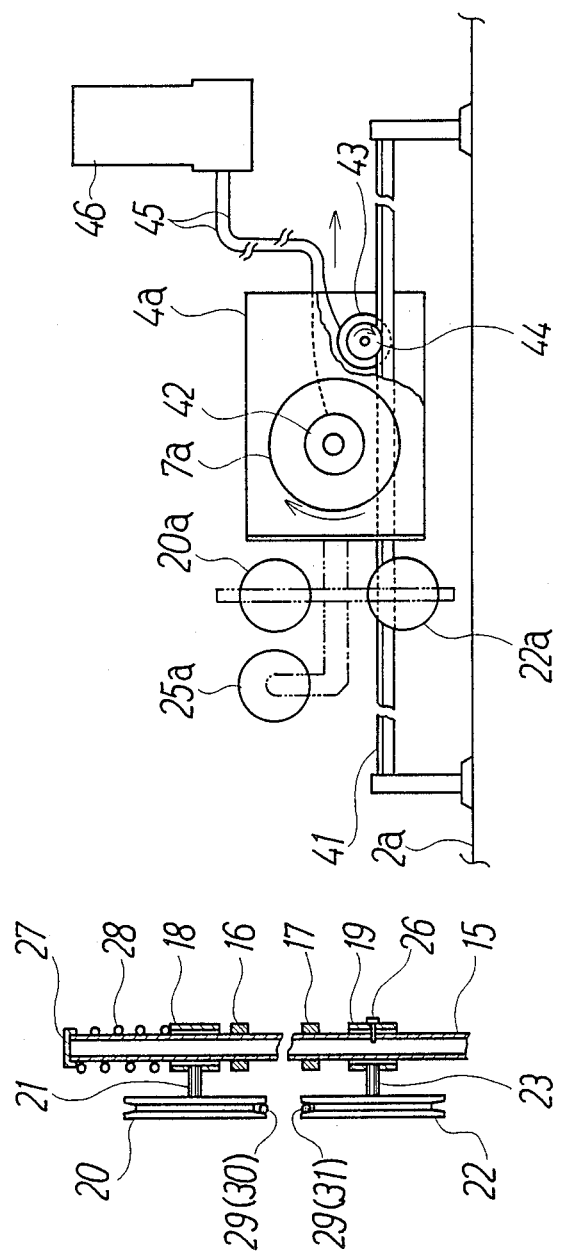

WIRE SAW DRIVE APPARATUS

BACKGROUND OF THE INVENTION

1. Field of the Invention

The present invention relates to a wire saw drive apparatus for circularly driving an endless cutting wire under a predetermined tension to cut off a ferroconcrete structure, for instance.

2. Description of the Prior Art

Conventionally, wire saw drive apparatus are used for quarrying stone in stone pits. The drive apparatus includes a carriage; a wire drive pulley rotatably supported by the carriage; pulley drive means for rotating the wire drive pulley on the carriage to circularly drive an endless cutting wire reeved around the wire drive pulley and an object to be cut; a pair of adjust pulleys rotatably supported by the carriage near the wire drive pulley, for guiding a tensile side and a loose side of the cutting wire and for adjusting an reeving angle of the cutting wire relative to the wire drive pulley; and carriage drive means for moving the carriage and maintaining the cutting wire under a desired tension during cutting operation.

Although the wire saws have mainly been used for cutting stone in stone pits, the present inventor has had an idea such that the wire saw could be applied to partial cutting of ferroconcrete structure in a building, a bridge, a subway etc. and also found that the wire saw cutting method can not only be applied to the ferroconcrete cutting work but also has various advantages such that there exists no limitation of an cutting area of an object to be cut; the cutting speed is high; the cutting work is safe, etc. as compared with the conventional disk blade cutting method.

However, when the prior-art wire saw drive apparatus is used as it is for cutting an object such as ferroconcrete structure, there exists a serious problem in that the cutting wire is easily broken by tension instantaneously increased when the cutting position changes from concrete material to reinforcing iron material during the cutting operation or when the moving cutting wire is caught by or eats into a sharpened cutoff steel end.

SUMMARY OF THE INVENTION

With these problems in mind, therefore, it is the primary object of the present invention to provide a wire saw drive apparatus which can immediately absorb and reduce an abnormal, instantaneously high tension of a moving cutting wire, to prevent the cutting wire from being broken.

To achieve the above-mentioned object, the wire saw drive apparatus according to the present invention comprises a carriage; a wire drive pulley rotatably mounted on the carriage; pulley drive means for rotating the wire drive pulley on the carriage to circularly drive an endless cutting wire reeved around the wire drive pulley and an object to be cut; a pair of adjust pulleys rotatably mounted on the carriage near the wire drive pulley for guiding the tensile side and loose side of the cutting wire, respectively and adjusting a wire reeving angle relative to the wire drive pulley; carriage drive means for moving the carriage and maintaining the cutting wire at a desired tension during cutting operation; and, additionally in particular, elastic means mounted between an adjust pulley supporting body for guiding at least the tensile side of the cutting wire and the carriage, for receiving a force applied from the cutting wire to the adjust pulley; and a guide pulley rotatably mounted on the carriage near the adjust pulley for guiding the tensile side of the cutting wire, for guiding the cutting wire into S shape fashion in cooperation with the adjust pulley.

The elastic means of the present invention can instantaneously absorb or reduce an instantaneous increase in cutting wire tension through the adjust pulley, therefore, it is possible to suppress or prevent cutting wire damage or breakage during cutting operation and/or cutting wire slip relative to the wire drive pulley at the start of or during cutting operation. Since the prevention of the cutting wire from breakage is to prevent the broken cutting wire form flying away, this contributes to a safe cutting work and improvement in economization and productivity, because cutting work is not interrupted due to cutting wire breakage or cutting wire repair work can be reduced. Further, the prevention of cutting wire slip relative to the wire drive pulley can reduce wearness on the groove of the wire drive pulley.

Further, it is essential and the most effective to provide this elastic means for the adjust pulley for guiding the tensile side at which an instantaneous increase in tension of the cutting wire will readily be produced. However, when the elastic means is additionally provided for the adjust pulley for guiding the loose side of the cutting wire, it is possible to more effectively absorb an instantaneous change in the secondary tension also produced on the loose side of the cutting wire.

The guide pulley of the present invention serves to allow the above elastic means to function stably and effectively. That is, since the cutting wire is always guided between the guide pulley and the adjust pulley in S-shape fashion, the arrangement relationship and the contact condition between the adjust pulley and the cutting wire guided therealong (which exert influence upon the function or performances of the elastic means) are maintained stably without being subjected to the influence of the arrangement direction of the tensile side of the cutting wire before being guided to the guide pulley or the fluctuations in tension caused during cutting operation.

In the case of ferroconcrete structure, being different from uniform stone, since this is composed of two materials (iron and concrete quite different in strength and hardness therebetween), a violent increase and decrease in tension of the cutting wire will be generated as already described. The wire saw drive apparatus according to the present invention is suitably serviceable in cutting ferroconcrete structure, as well as other materials.

BRIEF DESCRIPTION OF THE DRAWINGS

The present invention is more clearly illustrated in the accompanying drawings, wherein:

FIG. 2 is an enlarged cross-sectional view showing only elastic means, taken along the line I—I shown in FIG. 1;

FIG. 3 is a front view showing an essential portion of another embodiment of carriage drive unit according to the present invention.

DETAILED DESCRIPTION OF THE PREFERRED EMBODIMENTS

Figure 1:
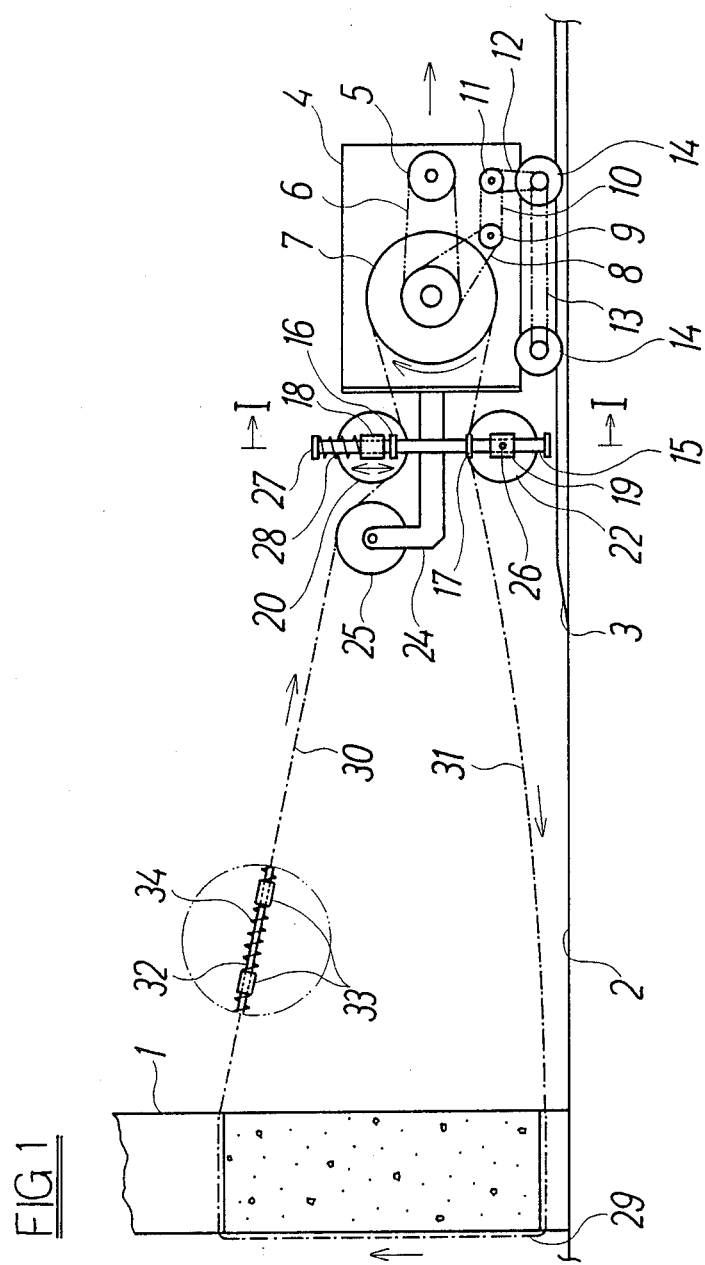
FIG. 1 is a front view showing an essential portion of a wire saw drive apparatus according to the present invention.

The present invention will be described with reference to the attached drawings. In FIGS. 1 and 2, rails 3 are laid on a road surface 2 in front of a transverse T-shaped ferroconcrete structure 1, and a carriage 4 is movably placed on the rails 3. On the carriage 4, there are mounted a prime mover 5, a wire drive pulley 7 driven by the prime mover 5 via a transmission belt 6, and wheels 14 driven by the prime mover 5 via the wire drive pulley 7, a transmission belt 8, a non-stage speed change gear 9, a transmission belt 10, a reduction gear 11, and transmission chains 12 and 13, in order. The wheels 14 are fitted to the rails 3.

Additionally, a vertical arm 15 is vertically provided on the carriage 4 in front of the wire drive pulley 7. An upper slider 18 and a lower slider 19 slidable within a range limited by an upper stopper 16 and a lower stopper 17, respectively are fitted to the vertical arm 15. A support shaft 21 for supporting a tensile side adjust pulley 20 is provided horizontally for the upper slider 18, while a support shaft 23 for supporting a loose side adjust pulley 22 is provided horizontally for the lower slider 19.

Further, a guide pulley 25 is pivotably supported by an auxiliary arm 24 extending from the vertical arm 15 beyond the tensile side adjust pulley 20.

These tensile side adjust pulley 20, the loose side adjust pulley 22 and the guide pulley 25 are all arranged so as to be flush with the wire drive pulley 7.

The lower slider 19 is fixed at a predetermined position to the vertical arm 15 by a stopper pin 26, and a compression spring 28 is mounted between an upper end stopper 27 and the upper slider 18 fitted to the vertical arm 15.

An endless cutting wire 29 is reeved around a horizontal projection of a ferroconcrete structure 1 and the wire drive pulley 7 in such a way that the tensile side 30 of the cutting wire 29 is reeved around the wire drive pulley 7 being guided from the outside of the guide pulley 25 to the inside of the tensile side adjust pulley 20 in S-shape fashion. The loose side 31 of the cutting wire 29 is directed toward the ferroconcrete structure 1 being guided form the wire drive pulley 7 to the inside of the loose side adjust pulley 22.

A well-known cutting wire 29 used is such that beads 33 formed with diamond abrasive grains on the surface thereof and spacer coil springs 34 are alternately fitted to a steel wire rope 32, as shown within a circle in FIG. 1.

In the construction as described above, when the wire drive pulley 7 and the wheels 14 are driven by the prime mover 5, since the wire drive pulley 7 is rotated and the carriage 4 is driven along the rails 3 in the arrow direction in FIG. 1, the cutting wire 29 circularly travels in the arrow direction in FIG. 1 at a desired speed under tension to cut off the ferroconcrete structure 1 along the vertical surface.

In case tension of the tensile side 30 of the cutting wire 29 increases instantaneously during cutting or at the start of cutting, the tensile side adjust pulley 20 moves upward instantaneously while compressing the compression coil spring 28 to absorb or reduce the abnormal high tension.

Other carriage drive means of the present invention different from the one shown in FIG. 1 will be described hereinbelow. In FIG. 3, a track 41 is laid on a road surface 2a and a carriage 4a is movably placed on the track 41.

On the carriage 4a, a hydraulic motor 42, a wire drive pulley 7a driven by the hydraulic motor 42, travel hydraulic motor 43, and a pinion 44 driven by the travel hydraulic motor 43 are mounted. The pinion 44 is in mesh with the track 41. When a desired hydraulic fluid is supplied form a hydraulic fluid control unit 46 to the hydraulic motor 42 and the travel hydraulic motor 43 via a hydraulic pipe 45, the wire drive pulley 7a and the pinion 44 are both driven, independently, so that the rotation of the pinion 44 causes the carriage 4a to move along the track 41 in the arrow direction in FIG. 3. In this carriage drive means, since watertight and airtight hydraulic apparatus such as the hydraulic motor 42, the travel hydraulic motor 43, etc. are incorporated, the wire drive apparatus of this type can be installed even in water for in-water cutting.

With respect to the construction other than this carriage drive means; that is, the elastic means, the tensile side adjust pulley 20a, the loose side adjust pulley 22a, the guide pulley 25a, etc. the same as those shown in FIGS. 1 and 2 or those described later with reference to FIGS. 4 to 7 can appropriately be incorporated to obtain the similar functions, the description thereof being omitted herein without showing them.

Figure 4:
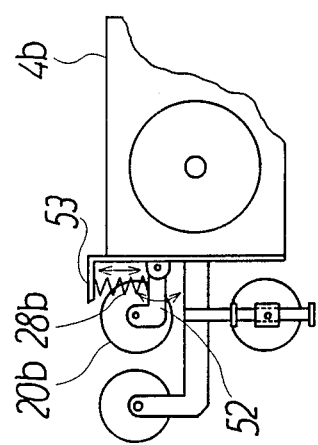
FIGS. 4 to 7 are front views each showing an essential portion of another embodiment of elastic means according to the present invention.
Figure 5:
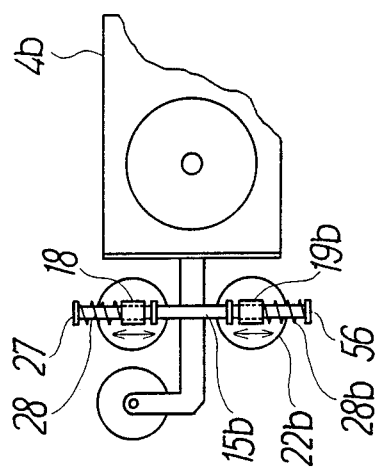

Elastic means of the present invention different from that shown in FIGS. 1 and 2 will be described hereinbelow. In FIG. 4, a pneumatic spring or hydraulic pneumatic cylinder 51 is mounted in place of the compression coil spring 28 (FIGS. 1 and 2) between an upper end stopper 27b and an upper slider 18b of a vertical arm 15b vertically disposed on a carriage 4b in the same way as in FIGS. 1 and 2. In FIG. 5, a pivotal arm 52 is mounted on the carriage 4b; this pivotal arm 52 is connected to an upper projection 53 of the carriage 4b via a compression spring 28b; and a tensile side adjust pulley 20b is rotatably attached to this pivotal arm 51. Further, in FIG. 6, an extension coil spring 55 is mounted between the upper slider 18b and an intermediate stopper 54 of the vertical arm 15b. Furthermore, in FIG. 7, the compression coil spring 28 is mounted between the upper end stopper 27 and the upper slider 18 of the vertical arm 15b in the same way as in FIGS. 1 and 2 and also another compression coil spring 28b is mounted between the lower slider 19b and the lower end stopper 56.

Figure 6:
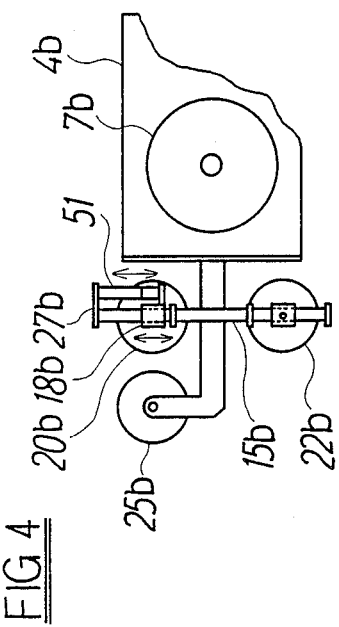
Figure 7:
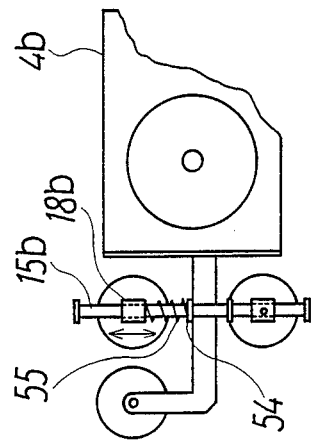

Although not shown and not described, it is also possible to provide another elastic means as shown in FIGS. 4 to 6, for instance for the loose side adjust pulley 22b in the same way as already described.

Further, with respect to the construction other than the elastic means; that is, the carriage drive means, the pulley drive means for the wire drive pulley 7b, the guide pulley 25b, etc., for instance, the same as those shown in FIGS. 1 and 2 can appropriately be incorporated to obtain the same functions, the detailed description being omitted herein without illustration.

As many apparently widely different embodiments of this invention may be made without departing from the spirit and scope thereof, it is to be understood that the invention is not limited to the specific embodiments thereof except as defined in the appended claims.

What I claim is:

1. A wire saw drive apparatus comprising a carriage, a wire drive pulley rotatably mounted on the carriage, pulley drive means for rotating the wire drive pulley on the carriage to circularly drive an endless cutting wire reeved around the wire drive pulley and an object to be cut, a pair of adjust pulleys rotatably mounted on the carriage near the wire drive pulley for guiding the tensile side and loose side of the cutting wire, respectively and adjusting a wire reeving angle relative to the wire drive pulley, and carriage drive means for moving the carriage and maintaining the cutting wire at a desired tension during cutting operation, characterized by elastic means mounted between an adjust pulley supporting body for guiding at least the tensile side of the cutting wire and the carriage, for receiving a force applied from the cutting wire to the adjust pulley, and a guide pulley rotatably mounted on the carriage near the adjust pulley for guiding the tensile side of the cutting wire, for guiding the cutting wire into S shape fashion in cooperation with the adjust pulley.

2. A wire saw drive apparatus according to claim 2, wherein said carriage drive means comprises rails laid on to a carriage driving direction, wheels rotatably mounted on the carriage and fitted to the rails, and wheel drive means for rotating the wheels.

3. A wire saw drive apparatus according to claim 1, wherein said carriage drive means comprises a track laid on to a carriage driving direction, a pinion rotatably mounted on the carriage and in mesh with the track, and pinion drive means for rotating the pinion.

4. A wire saw drive apparatus according to claim 1, wherein said elastic means are mounted between each adjust pulley supporting body for guiding the tensile side and loose side of the cutting wire, and the carriage, respectively.

5. A wire saw drive apparatus according to claim 1 or 4, wherein said elastic means is a compression spring.

* * * * *